United States Patent

Hou et al.

[11] Patent Number: 5,458,782
[45] Date of Patent: Oct. 17, 1995

[54] HYDROLYTICALLY STABLE NYLON MEMBRANE

[75] Inventors: Kenneth C. Hou, Monroe; James C. Disbrow, Meriden; Ronald V. Repetti, Guilford; C. Thomas Badenhop, Westport, all of Conn.

[73] Assignee: Cuno Incorporated, Meriden, Conn.

[21] Appl. No.: 178,742

[22] Filed: Jan. 7, 1994

[51] Int. Cl.[6] .................................................. B01D 71/56
[52] U.S. Cl. ...................... 210/651; 210/500.38; 264/41
[58] Field of Search .................. 264/41, 49; 210/500.38, 210/493.5, 650, 651, 652

[56] References Cited

U.S. PATENT DOCUMENTS

| | | | |
|---|---|---|---|
| 4,915,839 | 4/1990 | Marinaccio et al. | 210/504 X |
| 5,019,260 | 5/1991 | Gsell et al. | 210/490 |

FOREIGN PATENT DOCUMENTS 890437  2/1962  United Kingdom .

OTHER PUBLICATIONS

"Nylon 66, Section VIII. End Group Determination" by H. Hopff, pp. 194–197.

Primary Examiner—Frank Spear
Attorney, Agent, or Firm—Renner, Kenner, Greive, Bobak, Taylor & Weber

[57] ABSTRACT

A method for the production of a hydrolytically stable nylon membrane includes providing a nylon having at least about 0.9 moles of amino end groups per mole of nylon and preparing the nylon membrane therefrom. The membrane can be used in cartridges for use in filtration applications as may be necessary in the food and beverage industry as well as for the production of pharmaceuticals and the manufacture of electronic components. The membrane is capable of withstanding autoclaving and hot water sanitization without molecular dissociation regardless of its pore size, or thickness of the membrane, or the nylon solids content of the dope or, the temperature at which the dope is made.

17 Claims, 1 Drawing Sheet

5,458,782

HYDROLYTICALLY STABLE NYLON MEMBRANE

TECHNICAL FIELD

The present invention relates generally to nylon structures which are capable of withstanding autoclaving and hot water sterilization without molecular dissociation. More particularly, the invention relates to porous, hydrolytically stable, nylon membranes suitable for multiple cycles of such sterilization, as may be necessary in the food and beverage processing industry. Such membranes are made from high molecular weight nylon carrying not less than 0.9 moles of amino end groups per mole of nylon, and preferably more than 1.3 moles of amino end groups per mole of nylon.

BACKGROUND OF THE INVENTION

Nylon is the name given to a family of polyamide polymers characterized by the presence of the amide group —CONH— as a recurring unit of the main chain of the polymer. Notably, this polymer is seen as very weak structurally because the amide groups in nylon can be cleaved by active species such as free radicals or other oxidative reagents. Nylons are formed by reacting diacids and diamines through polycondensation to form a variety of nylons such as 66, 6, 610, 46 etc.

Thus, in order to inhibit the oxidative degradation of these nylons, additives such as antioxidants have been utilized. Examples of suitable antioxidants useful in improving nylon stability include certain alkylated phenols, polyphenolic compounds, aromatic amines and organic phosphites. Notably, the incorporation of an antioxidant or similar additive into nylon has been shown to provide improved resistance to both thermal degradation and photo oxidation based on the principle that the antioxidant destroys the oxidative species, thus preventing the dissociation of nylon molecules caused by those oxidative species.

In fact, numerous patents have been issued relating to the incorporation of an antioxidant into nylon for use as a stabilizer. For example, Thompson U.S. Pat. No. 3,180,849 adds phenyl halophosphine as an antioxidant stabilizing additive to nylon, while Rothrock U.S. Pat. No. 2,493,597 adds phosphite esters. Furthermore, Stamatoff U.S. Pat. No. 2,630,421 describes the synergistic combination of aromatic amines and phenols for resistance to thermal oxidation of nylon. Other organic stabilizers reported to be effective against nylon oxidation include stable radicals such as nitroxides and hydrazyls as described in Tazewell U.S. Pat. No. 3,477,986. Still further, Stokes U.S. Pat. No. 3,454,412 describes the mixing of UV absorbers and antioxidant for low melting nylon.

Although improving the thermal and light stability of nylon will extend its useful service life in many applications, several other applications require that nylon be stable in the presence of steam and/or hot water. In view of the fact that nylon has always been regarded as subject to degradation by hot water, improved hydrolysis resistant grades of nylon have long been sought.

At present, so-called hydrolysis resistant grades of nylon with improved performance in hot water use are commercially available for thermally molded products. These improved grades, however, are essentially nylons with antioxidant additives incorporated therein, and therefore, are essentially antioxidative grades of nylon. One example of such a nylon is the antioxidative grade Zytel 122L, commercially available form E. I. Du Pont de Nemours Co., Wilmington, Del. It has been shown that Zytel 122L has triple the service life in a hot water environment at 77° C. as compared to the non-additive grade of nylon Zytel 101, also commercially available from E. I. Du Pont de Nemours Co.

However, it has been clearly shown that the changes which take place for the molecular dissociation in nylon may not be simply related to hot water, but rather to the combination of hot water and oxygen dissolved in water. Thus, the oxygen content in water is inversely related to the useful life of nylon. For example, stagnant hot water in which oxygen is used up and is not replaced causes fewer changes to nylon than flowing hot water in which oxygen is continuously available. Also, as would be expected, the changes are also temperature dependent.

Nylon, such as Zytel 122L, which uses antioxidants or similar additives to inhibit hydrolytic degradation has been utilized extensively for injection or extrusion molding resins to produce a wide variety of plastic parts. However, this type of antioxidant-containing nylon does not inhibit hydrolytic degradation upon the formation of a membrane.

Nylon membranes are produced by dissolving nylon and minor ingredients in a solvent such as formic acid to form a polymeric dope solution. The dope is formed into a thin layer and quenched in a bath containing a non-solvent system such as methanol and/or water, whereupon micropores are formed in the resulting polymeric membrane. For a more detailed description of the process for preparing skinless microporous nylon membranes in which formic acid is used as a solvent to dissolve nylon, see Marinaccio et al. U.S. Pat. No. 3,876,738, Knight U.S. Pat. No. 5,084,179, and Pall U.S. Pat. No. 4,340,479, all of which are hereby incorporated by reference.

Unfortunately nylon membranes produced by the method(s) described hereinabove have amide groups which are susceptible to attack by oxidative species such as free radicals, and therefore, are not sufficiently resistant to hydrolytic degradation for many applications. Such applications would include, for example, filtration in the food and beverage industry, pharmaceuticals, electronics and other applications where hydrolytic stability is required. Desirably, filter elements for filter cartridges can be made from hydrolytically stable nylon membranes, with the membrane being cast on a support web. These cartridges should preferably withstand repeated cycling totalling at least 20 hours autoclaving with saturated steam at about 120° C. and/or at least 200 hours hot water flushing at about 80° C. in order to be suitable for use in the hereinabove cited applications.

Even when nylon having an antioxidant added thereto is employed as the raw material for the nylon membrane, there is still no improved resistance to hydrolytic degradation. Thus, the antioxidative effect found in pellets of nylon is missing when the nylon is formed into a membrane. It is believed that the antioxidant in the nylon is either insoluble in nylon solvent (formic acid) or its antioxidative effect is rendered ineffective or at least loses its chemical reactivity in the presence of other compounds of the polymer solution. Application of antioxidant to the membrane after membrane formation can be effective, but requires that the antioxidant so applied either be approved for its intended end-use, as for example Code of Federal Regulations approval for food contact, or be virtually non-extractable for critical applications such as are found in the pharmaceutical and electronics industries.

The need exists for a hydrolytically stable nylon membrane which is capable of withstanding repeated autoclaving and hot water sanitization without molecular dissociation for applications cited hereinabove. This invention describes a method for the preparation of these membranes.

SUMMARY OF INVENTION

It is therefore, an object of the present invention to provide a method for the production of porous nylon membranes which are hydrolytically stable without the addition of antioxidants or other adulterating agents.

It is another object of the present invention to provide a method for the production of nylon membranes which are capable of withstanding autoclaving and hot water flushing and sanitization.

It is yet another object of the present invention to provide a method for the production of nylon membranes which are suitable for use in filtration in the food and beverage industry, independent of the use of antioxidants, which must be acceptable under governmental standards published in the Code of Federal Regulations (CFR).

It is yet another object of the present invention to provide a method for the production of nylon membranes which are suitable for use in filtration in the pharmaceutical industry, independent of the use of antioxidants.

It is yet another object of the present invention to provide a method for the production of nylon membranes which are suitable for use in filtration in the electronics industry.

It is still another object of the present invention to provide a method for the production of hydrolytically stable nylon membranes which employ already known methods for the production of membranes.

It is a further object of the present invention to provide a method for the production of a filter cartridge made from a hydrolytically stable nylon membrane.

It is still a further object of the present invention to provide nylon membranes which are capable of withstanding repeated autoclaving totalling at least 20 hours with saturated steam at about 120° C. and at least 200 hours hot water flushing at about 80° C.

It is yet a further object of the present invention to provide a nylon membrane which can be made in cartridge form as a filter element.

At least one or more of the foregoing objects, together with the advantages thereof over the known art relating to nylon membranes and the methods for producing the same, which shall become apparent from the specification which follows, are accomplished by the invention as hereinafter described and claimed.

In general, the present invention provides a method for the production of a hydrolytically stable nylon membrane comprising the steps of providing a nylon having at least about 0.9 moles of amino end groups per mole of nylon and preparing a membrane from the nylon without affecting the amino end groups.

The present invention also includes a method for the production of a filter cartridge comprising the steps of providing a nylon having at least about 0.9 moles of amino end groups per mole of nylon; preparing a membrane from the nylon without affecting the amino end groups; and preparing a filter cartridge from the membrane.

The present invention further includes a method for filtering fluids comprising the steps of providing a nylon membrane produced from nylon having at least about 0.9 moles of amino end groups per mole of nylon; and passing the fluids through the membrane.

Still further, the present invention includes a hydrolytically stable nylon membrane comprising nylon having at least about 0.9 moles of amino end groups per mole of nylon, the membrane being capable of withstanding autoclaving and hot water sanitization without molecular dissociation.

BRIEF DESCRIPTION OF THE DRAWINGS

The drawing figure is a graph depicting the oxidative stability of three nylons having differing amounts of amino end groups measured by thermal gravimetric analysis (TGA).

PREFERRED EMBODIMENT FOR CARRYING OUT THE INVENTION

As noted hereinabove, the subject invention is directed toward the production of nylon membranes capable of withstanding repeated cycles of autoclaving and hot water sanitization without molecular dissociation. Such hydrolytically stable membranes are seen as useful for, among others things, filtration applications, especially in the food and beverage industry where following filtration of sub-micronic particles at or near ambient temperatures, hot water sanitization between use cycles is typically required. Thus, nylon membranes which are capable of withstanding repeated autoclaving totalling at least 20 hours with saturated steam at about 120° C. and at least 200 hours hot water flushing at about 80° C. are preferred.

The hydrolytic stability of the nylon membranes of the present invention is attributable to the specific chemical structure of the nylon employed to manufacture the membranes. That is, it has been discovered that specific nylon structures carrying not less than 0.9 moles of amino end groups per mole of nylon, and preferably more than 1.3 moles of amino end groups per mole of nylon, up to the maximum of two moles per mole of nylon such as about 1.82 moles per mole of nylon, will have the required stability with respect to temperature, and hydrolysis in water or steam for use in filtration and other applications under the conditions identified hereinabove. Accordingly, hydrolytically stable membranes can be achieved by selecting the type of nylon carrying the specific end groups disclosed hereinabove, i.e. amino end groups, in the amounts indicated.

Consequently, membranes made from such nylon do not require additives such as antioxidants to achieve stability. In addition, because stability of the membrane can be achieved simply by selecting the specific type of nylon carrying the specific end groups, the original membrane formation process may remain intact. In other words, teachings disclosed in U.S. Pat. Nos. 3,876,738, 5,084,179 and 4,340,479, the specifications of which are hereby incorporated by reference, will be unchanged and the quenching solutions will also be the same. Resulting pore sizes are controlled during membrane formation and range between from about 0.01 to 2 microns, although practice of the present invention is not necessarily limited thereto. Unlike previous membranes made by such processes, the membranes of the present invention have been found to be hydrolytically stable. It is necessary, however, for practice of the present invention that the amino end groups must not be affected during the casting and quenching operations.

In particular, it has now been discovered that the nature and number of end groups in nylon of a given molecular weight effectively dominates the chemical stability of the nylon membrane toward heat and oxidative species. However, the number and nature of these end groups depend upon the type of terminating chemical added to terminate the polymerization reaction. Molecular weight of the nylon polymer is typical of the weights recognized as suitable for membrane formation i.e. 25,000 up to about 42,000, average molecular weight.

More specifically, nylon is made by polymerizing diacid with diamine monomers. For example, nylon 66 is made from adipic acid and hexamethylenediamine. Nylon 66 will have either carboxylic, amino or other end groups, depending upon the type of terminating chemicals added to terminate the reaction. If an amino compound is added as the terminator, then the nylon will contain more amino end groups.

According to the present invention, it has been determined that the nature and the amount of those end groups in nylon has a profound effect on nylon membrane stability toward oxidative and hydrolytic degradation. If there are a sufficient number of amino end groups in nylon, the membrane made from such nylon is capable of withstanding autoclaving at 120° C. or hot water flushing at 80° C. for prolonged exposure time without exhibiting degradation. It is believed that the amino end groups may function as free radical scavengers to inhibit the reactivity of the free radicals toward amide groups in nylon. Such inhibitory effect protects the nylon membranes from degradation caused by the presence of an oxidative species.

Moreover, it is also theoretically possible that the amino end groups may interact with the amide groups in nylon to strengthen the weak vulnerable bond, thereby promoting nylon membrane stability. Nevertheless, no matter what mechanism is contributing to the membrane stability, the end results are that the nylon containing high amino end groups shows a significant improvement in membrane service life under autoclaving or hot water flushing conditions. Furthermore, as will be shown hereinbelow, filter cartridges made from the hydrolytically stable nylon membranes of the present invention and cast onto a polyester non-woven web have been found to be capable of withstanding hot water at 80° C. under continuous flow for over 460 hours without failure as compared to only 60 hours life for cartridges made from the conventional nylon having a low amount of amino end groups.

It is further believed that the molecular weight and crystallinity of nylon only affects the strength of the membrane and its dimensional stability upon drying and does not affect its chemical stability toward heat and oxidative species. As noted hereinbelow, an investigation of the nylon stability of the membrane toward oxidative degradation, by taking account of the effect of crystallinity, molecular weight, morphology and end groups on nylon structures shows that only the end groups affect chemical stability.

In order to demonstrate practice of the invention and to show that a specific type of nylon carrying amino end groups in larger amounts than other types of nylons provides the claimed superior performance in membrane stability after autoclaving or hot water flushing, several tests were performed and are detailed hereinbelow.

Production of nylon

In the present invention, any commercially available nylon raw material may be used provided, of course, it has the appropriate amount of amino end groups as noted hereinabove. It is very important to note, however, that prior to the discovery of the present invention, the nature and number of the end groups were not controlled in the production of commercial nylons typically used for membrane manufacture. Thus, no commercially available nylon suitable for membrane manufacture could be selected based upon its amino end group content. Preferably, nylon 66, a condensation product of adipic acid and hexamethylenediamine, is employed for membrane manufacture although other types of nylon, e.g., nylon 6, nylon 46, may be employed without departing from the spirit of the invention. In fact, substantially any nylon that can form a membrane can be employed for practice of the present invention so long as it possesses at least about 0.9 moles of amino end groups per mole of nylon and is otherwise suitable for the intended filtration application e.g., food, beverage or the like.

Notably, nylon is a polyamide polymer and contains both carboxyl and amino end groups. Again, however, the nature and number of those end groups in nylon depends upon the method of end capping to terminate the polymerization reaction. Because there are different ways to terminate the reaction and still produce nylon, it should be expected and is shown hereinbelow that the amount of amino end groups in nylon will be different from different producers, and may even differ from lot-to-lot by the same producer. Hence, in order to determine which nylons are suitable and can be selected for use in the production of hydrolytically stable nylon membranes, the amount of amino end groups must be evaluated.

Nylon End Groups Determination

In order to determine which nylon 66 carried the highest number of amino end groups, several nylon 66 samples from different producers were evaluated. The amino end groups in nylon may be determined by micro-analytical methods. Accordingly, nylon is first dissolved in phenol-methanol solvent. Once dissolved, it is titrated with standard hydrochloric acid using a potentiometric titration to end point. A 2.0 gram sample is weighed with an accuracy of ±1.0 mg, and placed into a 100 ml sample bottle containing 75 ml of $68/32$ percent by volume phenol/methanol solution. The sample is then placed on a heated stir block at 50° C. for 2 hours or until the sample is completely dissolved. Once the mixture is allowed to cool to room temperature, it is titrated with 0.02N hydrochloric acid. The sample solution is titrated past the inflection point. A blank titration can be prepared by potentiometrically titrating 75 ml of phenol/methanol solution. The results are calculated as moles of amino end group per mole of sample nylon by the following equation:

$$\text{Moles of Amino end groups/Mole nylon} = \frac{(A - B) \, C \cdot 1000}{D}$$

Where

A=Volume of titrating solution (ml) for sample

B=Volume of titrating solution (ml) for blank

C=Molarity of titrating solution

D=Sample weight in grams divided by nylon molecular weight

The results of this test for amino end groups in several different nylon 66 pellets from different producers are set forth in Table I hereinbelow.

TABLE I

Amino End Groups in Nylon Pellets from Different Producers

| Sample Number | Nylon Producer | Nylon Type | Molecular Weight | Moles of Amino End Groups/per mole Nylon |
|---|---|---|---|---|
| 1 | A | 66 Lot 1 | 36000 | 1.66, 1.62 |
| 2 | A | 66 Lot 2 | 36000 | 0.79, 0.94 |
| 3 | B | 66 | 38000 | 0.57, 0.68 |
| 4 | C | 66 | 38000 | 0.57, 0.76 |
| 5 | D | 66 | 40000 | 0.40, 0.52 |
| 6 | A | 6 | 42000 | 1.20 |
| 7 | E | 46 | 40000 | 1.15 |
| 8 | F | 66 | 38000 | 0.68 |
| 9 | A | 66 Lot 3 | 36000 | 1.58 |
| 10 | A | 66 Lot 4 | 36000 | 0.70 |

Oxidative Stability of Nylon

Figure 1:
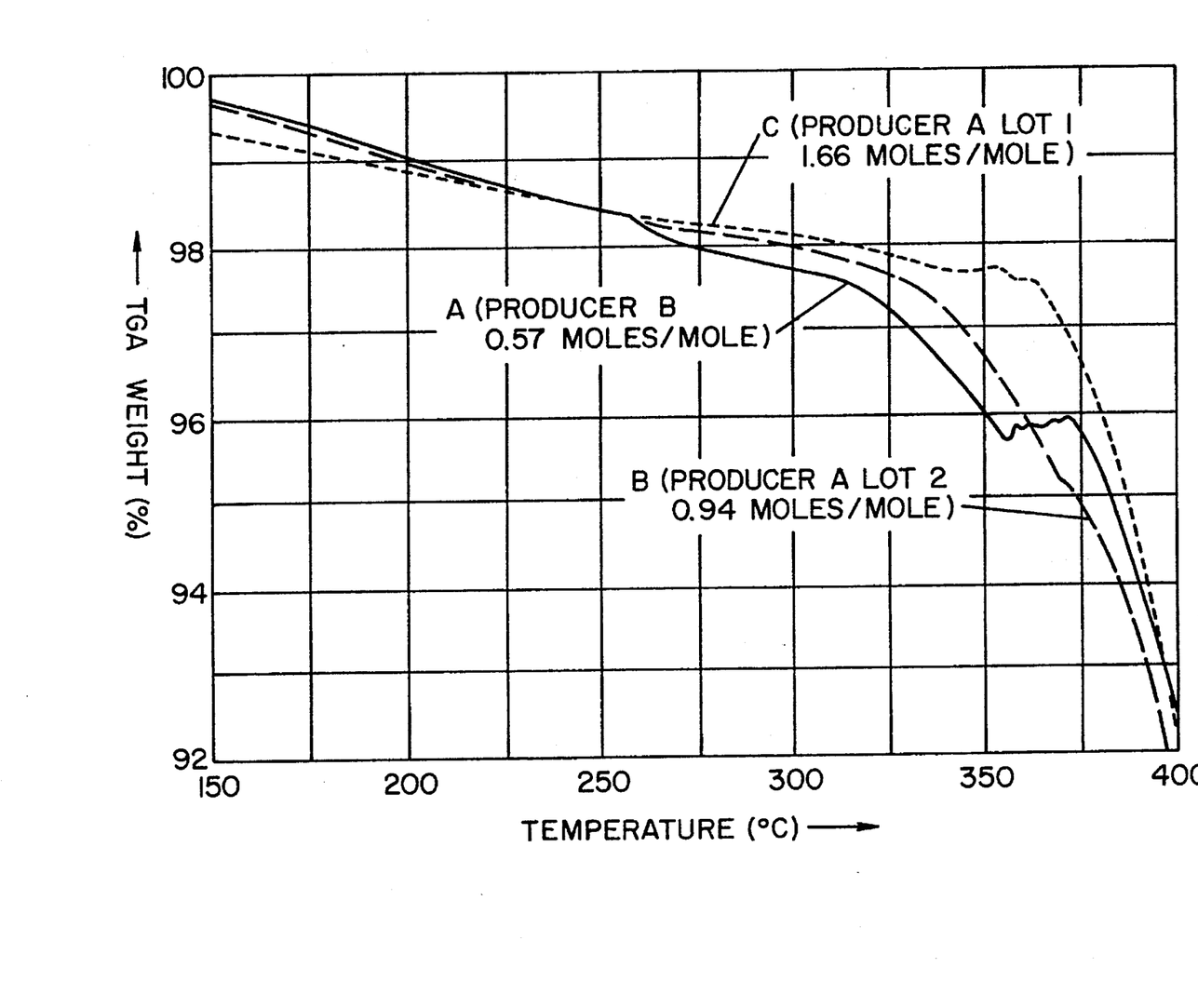

The oxidative stability of nylon has also been measured by thermal gravimetric analysis (TGA) using an E. I. DuPont Thermogravimetric Analyzer Model 951, heating rate 10° C./minute. Nylon pellets weighing about 20 mg were heated at 10 degrees per minute in air and the change in weight of the sample was monitored as a function of time. The graph in the drawing figure shows weight changes displayed by three samples having differing amounts of amino end groups. Notably, the sample with the highest amino end group content of 1.66 moles per mole, depicted as Curve C representing Producer A, Nylon 66 Lot 1, showed oxidative stability over 350° C., whereas the sample with the amino end group content of 0.57 moles per mole, depicted as Curve A representing Producer B, decomposed below 300° C. The other sample, containing 0.79 moles of amino end groups per mole, depicted as Curve B representing Producer A, Nylon 66 Lot 2, decomposed somewhere between the other two. Because all three samples were exposed under the same oxidative environment, the stability of nylon induced by the presence of high amino end groups is quite evident from this TGA measurement.

Production of Nylon Membranes

Preferably, microporous filter membranes are prepared from nylon, such as that disclosed hereinabove, by following the process described in Marinaccio et al. U.S. Pat. No. 3,876,738, Knight 5,074,179 and Pall 4,340,479. In particular, nylon was dissolved in a solution, preferably comprising a solvent (formic acid) and non-solvent (methanol) mixture, to form a dope solution. The dope solution was then cast onto a non-woven web in a quenching solution preferably comprising methanol and water. The resultant porous membrane was dried.

Membranes prepared from the above-tested nylon 66 pellets were characterized and found to have a nominal surface pore size rating of about 0.45 microns and were prepared to have about 5 to about 6 mil thickness with Initial Bubble Point (IBP) around 30 psi and Foam-All-Over-Point (FAOP) around 34 psi. To determine the Initial Bubble Point and the Foam-All-Over-Point, the membrane bubble point test was performed. In particular, a 47 mm diameter disc of the membrane sample may be placed in a special test holder which seals the edge of the disc. Above the membrane and directly in contact with the upper face thereof is a perforated stainless steel support screen which prevented the membrane from deforming or rupturing when air pressure is applied to the bottom face of the membrane. Above the membrane and support screen, the holder is provided with an inch deep cavity into which distilled water can be introduced. A regulated air pressure may be increased until a first stream of air bubbles is emitted by the water wetted membrane into the quiescent pool of water. The air pressure at which this first stream of air bubbles is emitted is called the Initial Bubble Point (IBP). For a more detailed description of this method, see ASTM Method F316-7.

Each membrane was then tested for the presence of amino end groups. The results of this test on each membrane as formed are presented in Table II hereinbelow. The prepared membranes were then autoclaved at 120° C. for 5 hours, and re-dried. The amount of amino end groups in the nylon membranes was then re-analyzed, the results also being presented in Table II hereinbelow and discussed thereafter.

Determination of Relationship Between Amino End Group Content in Nylon and Hydrolytic Stability of Membrane The hydrolytic stability of the membranes was determined by testing their burst strength, which is a direct indicator of mechanical integrity, and by measuring initial bubble point (IBP) and diffusion, which are measures of the integrity of the pore structure of the membranes. These tests establish that a relationship exists between the amount of amino end groups in nylon and the hydrolytic stability of the membrane produced from such nylon.

Burst Strength of Membrane

ASTM method D774 for measuring burst strength of paper was employed to determine the mechanical integrity or stability of the membrane. This test determines the hydrostatic pressure in pounds per square inch (psi) required to produce rupture of the membrane when the pressure is applied at a controlled increasing rate through a rubber diaphragm to a circular area 1.2 inches in diameter. The area of the membrane under test is initially flat and held rigidly at the circumference but is free to bulge under the increasing pressure during the test. The point at which the membrane bursts defines the hydrostatic pressure in psi referred to as membrane burst strength. The results of this test are also presented in Table II hereinbelow.

TABLE II

Amino End Groups in Various Nylon 66 - 0.45 Micron Membranes - Effect of Autoclave Exposure Time on Burst Strength

| Sample Number | Nylon Producer | Moles Amine Groups per Mole Nylon (Non-Autoclaved) | 120° C. Autoclave Exposure Time Burst Strength (psi.) | | | | | | Moles Amine Groups per Mole Nylon (After Autoclaving) |
|---|---|---|---|---|---|---|---|---|---|
| | | | 0 | 3 hr. | 6 hr. | 9 hr. | 12 hr. | 15 hr. | |
| 11 | A Lot 1 | 1.66 | 8.0 | 8.25 | 8.35 | 8.5 | 6.75 | 5.0 | 1.4 |
| 12 | A Lot 2 | 0.94 | 7.8 | 6.25 | 6.25 | 7.5 | 5.6 | 4.0 | 0.50 |
| 13 | B | 0.57 | 7.8 | * | * | * | * | * | 0.38 |
| 14 | C | 0.57 | 9.0 | * | * | * | * | * | 0.49 |
| 15 | D | 0.40 | 10.0 | * | * | * | * | * | 0.32 |

*These membranes did not pass three hours autoclave. Amine content was tested after three hours.

Notably, the results in Table I and Table II hereinabove indicate that the amount of nylon amino end groups is not affected by the membrane formation process. Substantially the same numbers of amino end groups are found in the formed membrane as are found in the original nylon pellets (Table I).

The results shown in these Tables also indicate that there is no correlation between the nylon molecular weight and its amino end groups. In fact, nylon 66 from Producer A Lot 1 has a molecular weight slightly lower than the other nylons listed in Table I, yet it contains the highest number of amino end groups.

As can also be seen from Table II in view of Table I, the nylons with a high molecular weight produced membranes with better strength, but the high molecular weight had no effect on hydrolytic stability. In other words, the length of the nylon chain in the polymer structure does not affect the hydrolytic stability of the membrane. All the amide groups in the nylon chain are equally vulnerable to the attack by the oxidative species unless sufficient number of amino end groups exist to protect them.

Production of Filter Cartridges.

Hydrolytically stable nylon membranes can be made into cartridge form by the method described in Meyering et al. U.S. Pat. No. 4,579,698, hereby incorporated by reference. More specifically, the membrane is cast onto a non-woven polyester web having a thickness of about 2 to 2.5 mil, such as is available under the tradename "Hollytex". The composite filter membrane is interleaved with upstream and downstream supports pleated transversely to its length, side seamed longitudinally and formed into a cylinder. The cylinder is then slipped over a foraminous cylindrical core which is provided with apertures for flow into the open interior of the core. The filter membrane and core are then slipped into an outer cylindrical member which is also provided with apertures. The ends of the cylinder are then capped by end caps to form a filter cartridge. The cartridge may then be installed in a proper housing such that fluid can flow from the outside of the filter element through the interior thereof, or vice versa, depending upon the filter, to be filtered. The integrity of the membrane cartridge may be tested in a non-destructive manner by measuring air passage through the wetted membrane as detailed hereinbelow.

Diffusional Flow Test on Membrane Cartridge Integrity

To begin, the cartridge may be "wetted out" with 30 gallons of deionized water at 3 gpm (gallons per minute) for 10 minutes. Upon wetting, the cartridge may be installed in a housing and operatively connected to a pressure regulator via an inlet pressure line. An outlet line leads from the filter to a plastic beaker, the line being operatively connected to a buret which, in turn, is operatively connected to a syringe. Once the test apparatus is constructed, the inlet line pressure may be raised slowly to 10 psig, and the cartridge may be allowed to stabilize at that pressure for approximately one minute. The plastic beaker may be filled with deionized water. Then, using the syringe, water may be suctioned up into the buret to the 100 ml mark. The water filled buret is then placed over the assembly. Using a timer, the total air flow from the cartridge may be measured, and the amount of air passing through the cartridge may be determined by reading the calibrated buret and assessing the milliliters of water displaced, i.e., the amount of air in the buret.

In tests performed in accordance with the present invention, filter cartridges having 8.0 square feet of membrane material were tested for hydrolysis resistance by flowing 80° C. water at 3 gpm continuously. After a certain period of time, each cartridge was disconnected from the assembly to test its integrity by measuring the air diffusion rate through the wetted cartridge. A 0.45 micron membrane integral cartridge preferably has an air diffusion rate of less than about 1 ml/min at 10 psi. Notably, an abrupt change in diffusion rate can be observed as soon as the membrane shows disintegration caused by hydrolytic oxidation of nylon. Thus, it is generally easy to determine when disintegration begins to occur. The results of the air diffusion test are presented in Table III hereinbelow.

TABLE III

| Sample Number | Nylon Producer | Amino End Groups (moles/mole) | Air Diffusion Test on 0.45 Micron Nylon Membrane Cartridges | | | | | | |
|---|---|---|---|---|---|---|---|---|---|
| | | | Diffusion Rate (ml/min) at Different Times | | | | | | |
| | | | Initial | 20 hrs | 40 hrs | 60 hrs | 80 hrs | 100 hrs | 460 hrs |
| 16 | B | 0.57 | 0.0 | 0.6 | 0.2 | 0.6 | 708 | >1000 | — |
| 17 | B | 0.57 | 1.0 | 1.4 | 0.2 | 1.2 | 348 | >500 | — |
| 18 | A Lot 2 | 0.94 | 6.2 | 2.2 | 2.5 | 8.4 | 28 | >500 | — |
| 19 | A Lot 2 | 0.94 | 6.0 | 5.2 | 4.8 | 38 | 209 | >500 | — |
| 20 | A Lot 1 | 1.66 | 5.4 | 1.0 | 2.0 | 0.8 | 0.8 | 0.2 | 0.0 |
| 21 | A Lot 1 | 1.66 | 1.2 | 0.8 | 1.0 | 1.0 | 0.6 | 0.4 | 0.8 |
| 22 | A Lot 1 | 1.66 | 7.8 | 9.4 | 8.0 | 10.2 | 10.4 | 7.4 | 12.0 |

Based upon the results of Table III, it is clear that the nylons containing high amounts of amino end groups have far greater hydrolytic stability.

The samples of Producer B which have low amounts of amino end groups lasted about 60 hours under the prescribed testing conditions whereas the sample nylons of Producer A Lot 1 having high amounts of amino end groups showed no sign of failure even after 460 hours of continuous hot water flushing.

Thus, it should be evident that nylon of a specific chemical property, i.e., having at least about 0.9 moles of amino end groups per mole of nylon, preferably greater than 1.3 moles of amino end groups per mole of nylon and more preferably greater than 1.6 moles of amino end groups per mole of nylon, may be used to increase resistance to hydrolytic degradation which usually occurs with conventionally produced nylon membrane. Significantly, it has been found that amino end groups in nylon are important for hydrolytic stability not only in single membrane film form but also in the form of filter cartridges made from such material. Hence, for so-called sterile filtrations involving beverage and biological fluids, wherein the filter element is required to be sanitized or sterilized by autoclaving or hot water flushing prior to use, the filtration cartridge and membrane of this invention are resistant to such treatment and retain their integrity under such conditions.

Having now generally described this invention, it will become better understood by reference to specific examples. These examples are included herein for the purpose of further illustrating and supporting the claim of the invention and should not be seen as necessarily limiting the invention in any way.

EXAMPLE 1

Hydrolytically Stable Microporous Nylon Membrane of Varying Porosity

In order to demonstrate that there is no relationship between pore size and hydrolytic stability of the membranes of the present invention, a nylon dope comprising a casting solution of 18 percent by weight nylon 66 with 1.66 moles of amino end groups per mole of nylon, and a mixture of formic acid as solvent and methanol as non-solvent in a predetermined ratio (see percent of formic acid and percent of methanol in Table IV) was prepared to produce the desired membrane porosity. The above-prepared nylon dope was cast to form a microporous membrane about 5 to 8 mils in final total thickness. A quench bath composition of about 25 percent by weight methanol and about 75 percent by weight water was used to convert the dope film into microporous membrane. The wet gel membrane was then dried at 85° C. for 15 minutes.

The specific pore sizes of each of the nylon 66 membranes produced and other characteristics of the membranes are set forth more particularly in Table IV hereinbelow.

invention. The burst strength of each of the membranes was determined, and the results of this test are shown in Table V hereinbelow. Other membrane samples evaluated with less than 0.9 moles amine end groups per mole nylon failed in less than 3 hours and hence, were not included in Table V.

TABLE V

Effect of Membrane Porosity on Hydrolytic Stability
(1.66 Moles Amine End Groups per Mole Nylon)

| Sample Number | Membrane Pore Size (μm) | Burst Strength (psi) | | | | |
| --- | --- | --- | --- | --- | --- | --- |
| | | Before Autoclaving | After Autoclaving | | | |
| | | | 3 hr | 6 hr | 9 hr | 12 hr |
| 23 | 0.65 | 9.0 | 9.5 | 9.8 | 8.9 | 7.0 |
| 24 | 0.45 | 9.0 | 9.2 | 10.0 | 8.6 | 7.2 |
| 25 | 0.30 | 9.0 | 9.1 | 9.9 | 9.2 | 7.5 |
| 26 | 0.20 | 9.0 | 8.9 | 9.7 | 9.0 | 7.5 |
| 27 | 0.15 | 9.0 | 9.2 | 9.6 | 9.0 | 7.6 |
| 28 | 0.10 | 9.0 | 9.0 | 9.5 | 8.9 | 7.8 |

As shown in Table V, no significant change in burst strength occurred among the nylon membranes over a 12-hour test period. This result provided further evidence that hydrolytic stability is not affected by the porosity of the membranes made from nylon of high amino end group content.

EXAMPLE 2

The Effect of Nylon Concentration in Dope on Membrane Stability

Next, the effect of an increase or decrease in the amount of nylon employed to form the dope was examined. Theoretically, it is believed that a higher nylon solids content in nylon dope would form membranes with higher numbers of

TABLE IV

Formulations of Hydrolytically Stable Nylon 66 Membranes of Different Porosity

| Sample Number | Nylon (wt %) | Formic Acid (wt %) | Methanol (wt %) | Flow Rate (ml/min) | IBP (psi) | FAOP (psi) | Pore Size (μm) |
| --- | --- | --- | --- | --- | --- | --- | --- |
| 23 | 18 | 76.6 | 5.4 | 314 | 16 | 19 | 0.65 |
| 24 | 18 | 76.2 | 5.8 | 156 | 26 | 28 | 0.45 |
| 25 | 18 | 75.8 | 6.2 | 135 | 32 | 34 | 0.30 |
| 26 | 18 | 75.4 | 6.6 | 84 | 39 | 44 | 0.20 |
| 27 | 18 | 75.0 | 7.0 | 49 | 51 | 59 | 0.15 |
| 28 | 18 | 74.6 | 7.4 | 36 | 60 | 70 | 0.10 |

For the data in Table IV, once the Initial Bubble Point pressure was determined and recorded, the air pressure was further increased until the air flow through the wetted membrane sample reached 100 cc/min, as measured by a flow meter in the line between the regulator and the sample holder. The air pressure at this flow rate is the Foam-All-Over-Point (FAOP).

The above-prepared nylon 66 membranes covering pore sizes ranging from about 0.1 to about 0.65 microns were then autoclaved at 120° C. for 12 hours. It will be appreciated that membranes having a pore size of from about 0.01 to about 2 microns are preferred for practice of the present nylon molecules per unit surface area which, in turn, would lead to improved stability of the membrane toward oxidative degradation with the limiting factor being the solubility of nylon in the dope. Accordingly, differing amounts of nylon 66 solids were used to make dopes for microporous membranes from either of two types of nylon, one having a high amino end group content (Producer A Lot 1) and the other having a low amino end group content (Producer B). Then, the burst strength of each of the membranes was determined and the results are presented in Table VI hereinbelow.

TABLE VI

Effect of Percent Solid on Membrane Stability

| Sample Number | Nylon Producer | Nylon Solids in Casting Dope (%) | Burst Strength (psi) Before Autoclaving | After Autoclaving 3 hr | 6 hr | 9 hr | 12 hr |
|---|---|---|---|---|---|---|---|
| 29 | B | 16 | 7.8 | * | | | |
| 30 | B | 18 | 10.0 | * | | | |
| 31 | A Lot 1 | 16 | 5.5 | 5.0 | 5.6 | 5.7 | 5.8 |
| 32 | A Lot 1 | 18 | 9.0 | 10.1 | 10.4 | 9.5 | 7.25 |
| 33 | A Lot 1 | 20 | 11.0 | 12.7 | 12.6 | 13.8 | 12.25 |

*Indicates that the membrane fell apart after exposure to autoclaving

The above results show that the initial strength of the membrane increased with increasing nylon in the dope and the stability of the membrane improved accordingly. However, it is noted that the membrane produced from nylon carrying about 0.57 moles of amino end groups per mole of nylon (Producer B) (Sample No. 29) still failed after autoclaving even though its initial strength improved where a higher nylon solid content was used (Sample No. 30). In contrast, the membranes produced from nylon carrying about 1.66 moles of amino end groups per mole of nylon (Producer A Lot 1) showed excellent stability, even at the lowest 16 percent solids value (Sample No. 33).

EXAMPLE 3

Effect of Membrane Thickness on Hydrolytic Stability

The effect of the thickness of the membrane on hydrolytic stability was examined. While it would appear clear that membranes having more thickness would provide greater strength as compared to those membranes of lesser thickness, membranes of different thickness were cast from the 18 percent nylon solids dope, containing high amino end group content nylon, Producer A Lot 1, and from the 16 percent nylon solids dope, containing low amino group content nylon, Producer B, with all of the membrane samples having about 0.45 micron pores, to determine if hydrolytic stability was affected. The burst strength of each of the membranes was again determined, the results being presented in Table VII.

membrane increased with an increase in the thickness of the nylon membrane. However, the membranes of Sample Nos. 34, 35, produced from nylon having about 0.57 moles of amino end groups per mole of nylon (Producer B) still failed after autoclaving even though their initial strength improved when membranes of greater thickness were produced. In contrast, the membranes of Sample Nos. 36–38 produced from nylon carrying about 1.66 moles of amino end groups per mole of nylon (Producer A Lot 1) showed excellent stability, even at a thickness of about 4 mil.

EXAMPLE 4

Effect of Dope Temperature on Membrane Stability

Because the porosity of the membrane can usually be affected by nylon solvation parameters, such as the nature of solvent and non-solvent and their ratio in the dope, as well as the temperature at which the dope is prepared, examination of the effect of temperature, without changing the solvent and non-solvent in dope preparation, in solubilizing nylon for creating different sizes of pores in membrane was conducted. More specifically, how such a nylon solubilizing effect, induced by temperature, relates to the hydrolytic stability of the membrane after it has been produced was evaluated, and the results of this evaluation are presented in Table VIII hereinbelow.

TABLE VII

Effect of Membrane Thickness on Membrane Stability for Nylon 66

| Sample Number | Nylon Producer | Membrane Thickness (mils) | Burst Strength (psi) Before Autoclaving | After Autoclaving 3 hr | 6 hr | 9 hr | 12 hr |
|---|---|---|---|---|---|---|---|
| 34 | B | 7.8 | 7.8 | * | | | |
| 35 | B | 10.0 | 9.5 | * | | | |
| 36 | A Lot 1 | 4.0 | 6.0 | 6.5 | 6.2 | 5.5 | 5.0 |
| 37 | A Lot 1 | 7.0 | 9.0 | 10.1 | 10.4 | 9.5 | 7.25 |
| 38 | A Lot 1 | 10.0 | 12.0 | 11.0 | 11.5 | 11.8 | 11.0 |

*Indicates that the membrane fell apart after exposure to autoclaving

The results shown hereinabove verify that strength of the

TABLE VIII

Effect of Dope Temperature on Membrane Stability

| Sample Number | Nylon Producer | Dope Temperature | Flow Rate (ml/min) | IBP (psi) | FAOP (psi) | Burst Strength (psi) Initial | Burst Strength (psi) 12 hr. |
|---|---|---|---|---|---|---|---|
| 39 | B | 34° C. | 85 | 37 | 41 | 7.8 | * |
| 40 | A Lot 1 | 30° C. | 61 | 44 | 51 | 9.5 | 8.0 |
| 41 | A Lot 1 | 34° C. | 150 | 30 | 34 | 9.0 | 7.25 |
| 42 | A Lot 1 | 38° C. | 220 | 26 | 28 | 8.0 | 6.0 |

*Indicates that the membrane fell apart after exposure to autoclaving

The above results indicate that nylon membranes prepared from dopes made at higher temperature generally have larger pores with higher flow rate and a slightly reduced strength, but the hydrolytic stability of these membranes generally remains consistent with other data of record hereinabove in that the membranes carrying a sufficiently high number of amino end groups in the original nylon raw material will not disintegrate as readily as membranes containing a low amount of amino end groups.

In conclusion, it should be evident from the foregoing examples and specification disclosure that the nylon membranes of the present invention exhibit improved hydrolytic stability over conventional nylon membranes produced from nylon terminated with low amine end group content. Moreover, the production method disclosed herein is highly effective in producing a hydrolytically stable nylon membrane. The invention is particularly suited for membranes employed in filter cartridges for filtering applications, but is not necessarily limited thereto. The membranes and method of the present invention can be used separately with other equipment, methods and the like, and is especially useful in applications for the food and beverage, pharmaceutical and electronics industries.

In addition to the foregoing uses, the nylon membranes of the present invention could also be employed as transfer blotting membranes, where multiple reusability and stability under high alkaline conditions are required. The membranes of the present invention are also susceptible to charge modification, making them useful in other applications.

Although the invention disclosed herein has been described in conjunction with the selection and utilization of nylons having at least about 0.9 moles of amino end groups per mole of nylon, it may be possible to obtain hydrolytic stability from nylons terminated with other end groups, depending upon the chemical added to terminate the polymerization reaction. Where the alternative end groups, can provide activity as a free radical scavenger, without loss of such activity during membrane formation, hydrolytic stability can also be exhibited. In such manner, the resulting nylon membrane should be CFR acceptable because the stabilizing end group is part of the polymer molecule, and not a protective coating or additive that could separate from the membrane to contaminate the filtrate.

Additionally, practice of the present invention has been described in conjunction with a nylon forming membrane i.e., one having an appropriate molecular weight, and having a high amino end group content. Nonetheless, it is also possible to combine two or more nylons to form blends for the preparation of hydrolytically stable membranes. Suitable blendable nylon polymers could include low molecular weight nylons having high amino end group contents and high molecular weight nylons having low amino end group contents and the like where the blend contains a sufficient amount of nylon polymer containing a high amino end group content, to impart hydrolytic stability. Some such blends can be formed by solution blending while others can be formed by melt blending or by mechanical blending, depending upon the types of nylons selected. The only limitation would be that the nylons selected be suitable for the filtration application desired.

Based upon the foregoing disclosure, it should now be apparent that the methods for production and use of the membranes described herein will carry out the objectives set forth hereinabove. It is, therefore, to be understood that any variations evident fall within the scope of the claimed invention and thus, the selection of specific component elements can be determined without departing from the spirit of the invention herein disclosed and described. In particular, the membranes according to the present invention are not necessarily limited to those having a particular thickness, or porosity, or pore size, or to those made from dopes of a specific nylon solids content. Moreover, other apparatus and equipment for the preparation of the membranes or the cartridges can be substituted for the apparatus and equipment disclosed herein. Thus, the scope of the invention shall include all modifications and variations that may fall within the scope of the attached claims.

What is claimed is:

1. A method for the production of a hydrolytically stable nylon membrane comprising the steps of:

providing a nylon having a molecular weight of at least 25,000 and having at least about 0.9 moles of amino end groups per mole of nylon; and preparing the membrane from said nylon without affecting said amino end groups, the membrane being made and arranged to withstand repeated cycles totalling more than about 20 hours autoclaving in saturated steam at about 120° C. or repeated cycles totaling at least about 200 hours hot water flushing at about 80° C.

2. The method, as set forth in claim 1, said nylon having at least about 1.3 moles of amino end groups per moles of nylon.

3. The method, as set forth in claim 1, said nylon having more than about 1.7 moles of amino end groups per mole of nylon.

4. The method, as set forth in claim 1, wherein said step of preparing membranes includes the steps of:

dissolving said nylon in a solution; and casting said solution in a quenching solution to form a microporous membrane.

5. The method, as set forth in claim 4, wherein said solution comprises a formic acid and methanol mixture, and wherein said quenching solution comprises methanol, water and formic acid.

6. A method, as set forth in claim 4, wherein said step of preparing further includes the step of drying said microporous membrane to form a membrane having a pore size range of from about 0.01 to about 2 microns.

7. A method for the production of a filter cartridge comprising:

providing a nylon having a molecular weight of at least 25,000 and comprising at least about 0.9 moles of amino end groups per mole of nylon;

preparing a membrane from said nylon without affecting said amino end groups, said membrane being made and arranged to withstand repeated cycles totalling more than about 20 hours autoclaving in saturated steam at about 120° C. or repeated cycles totaling at least about 200 hours hot water flushing at about 80° C.; and preparing a filter cartridge from said membrane.

8. The method, as set forth in claim 7, said nylon having at least about 1.3 moles of amino end groups per mole of nylon.

9. The method, as set forth in claim 7, said nylon having more than about 1.7 moles of amino end groups per mole of nylon.

10. The method, as set forth in claim 7, wherein said step of preparing a filter cartridge includes the steps of pleating said membrane; and forming a cartridge therefrom.

11. The method, as set forth in claim 10, wherein said pleated membrane of the cartridge is cylindrical and of varying length and can be utilized to filter beverages and biological fluids.

12. A method, as set forth in claim 10, wherein said pleated membrane of the cartridge is cylindrical and of varying length and can be utilized to filter pharmaceutical fluids.

13. A method, as set forth in claim 10, wherein said pleated membrane of the cartridge is cylindrical and of varying length and can be utilized to filter fluids in conjunction with the manufacture of electronic components.

14. The method, as set forth in claim 7, including the additional steps of sanitizing and sterilizing said membrane of said cartridge with heat or hot water or both without molecular dissociation.

15. A method for filtering fluids comprising the steps of:

providing a nylon membrane produced from a nylon having a molecular weight of at least 25,000 and having at least about 0.9 moles of amino end groups per mole of nylon, said membrane being made and arranged to withstand repeated cycles totalling more than about 20 hours autoclaving in saturated steam at about 120° C. or repeated cycles totaling at least about 200 hours hot water flushing at about 80° C.; and passing the fluids through said membrane.

16. A method for filtering fluids, as set forth in claim 15, wherein said fluids are selected from the group selected from beverages, biological fluids, pharmaceutical fluids and fluids in conjunction with the manufacture of electronic components.

17. A method for filtering fluids, as set forth in claim 15, wherein said nylon membrane is pleated and formed into a cartridge.

* * * * *